E. E. OWENS.
MECHANICAL FISHING DEVICE.
APPLICATION FILED AUG. 5, 1911.
1,022,377.
Patented Apr. 2, 1912.
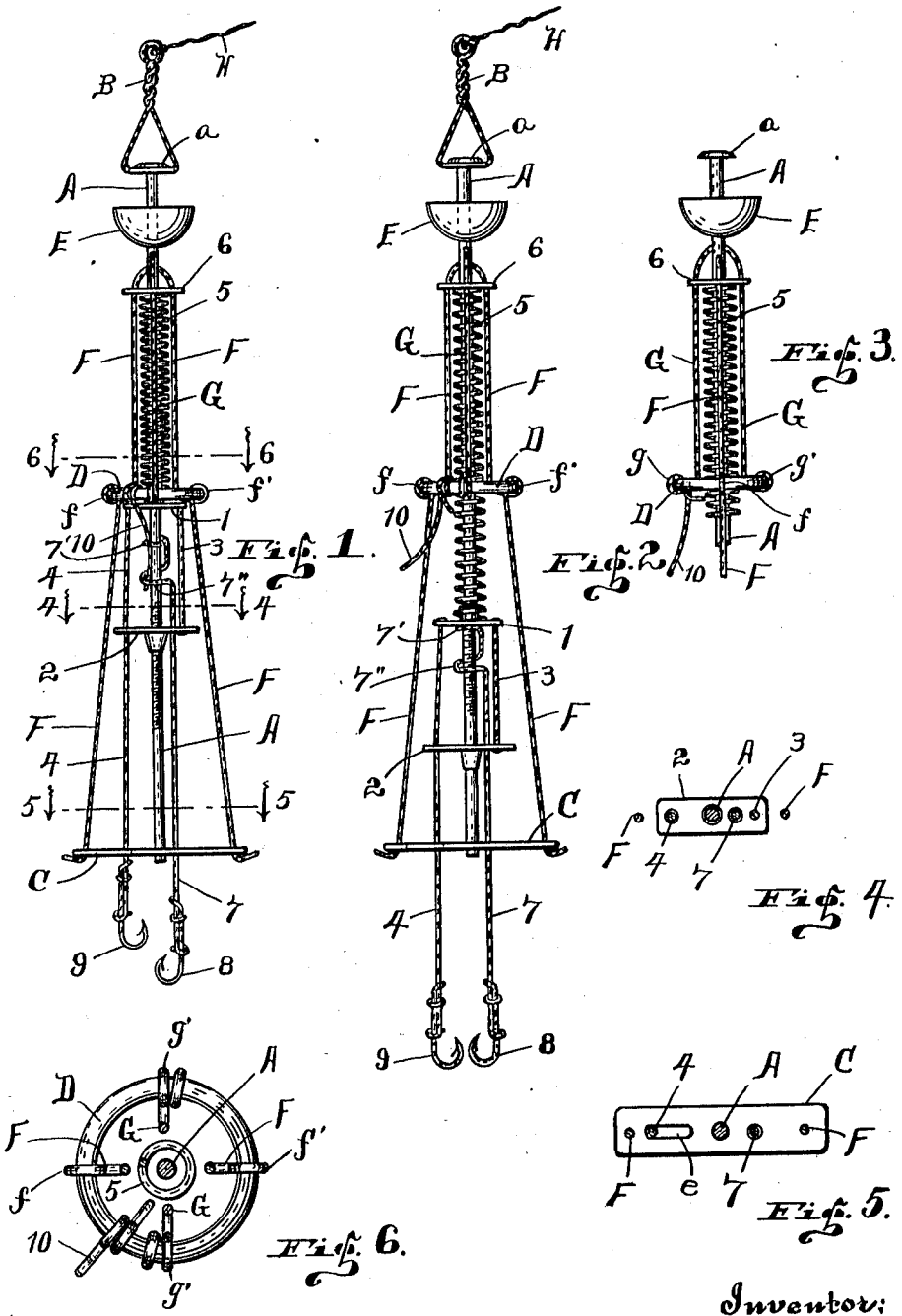
Witnesses:
Adelaide Kearns.
R. E. Randle.
Inventor:
Edgar E. Owens,
By Robert W. Randle,
Attorney.

UNITED STATES PATENT OFFICE.

EDGAR E. OWENS, OF CAMBRIDGE CITY, INDIANA.

MECHANICAL FISHING DEVICE.

1,022,377.  Specification of Letters Patent.  Patented Apr. 2, 1912.

Application filed August 5, 1911. Serial No. 642,547.

*To all whom it may concern:*

Be it known that I, EDGAR E. OWENS, a citizen of the United States, residing in Cambridge City, in the county of Wayne and State of Indiana, have invented certain new and useful Improvements in Mechanical Fishing Devices, of which the following is a full, clear, and comprehensive exposition and specification, being such as will enable others to make and use the same with absolute exactitude.

The object of my present invention, broadly speaking, is to provide a new and useful fishing device which will be strong and durable in construction, positive in action, easily operated and controlled, comparatively simple in its several parts, and which can be manufactured and sold at a comparatively low price.

More specifically stated my object is to provide a fishing device which may be set in position and which will require practically no attention, it being adapted to engage the fish and hold it until the attendant arrives regardless of the time, as there is practically no way for the fish to release itself or to become disengaged without manual assistance, thereby making the device very positive and enabling the attendant to have a great many fishing devices set at one time giving attention thereto in their order.

Other objects and particular advantages of my invention will be made apparent in the course of the following specification, and that which is new will be correlated in the appended claims.

One manner for the accomplishment of my invention in a practical manner is shown in the accompanying drawings, in which—

Figure 1 shows my invention in elevation, showing the position of the parts when the device is set ready for operation. Fig. 2 is the same as the first named view except that the device is shown as having been thrown or sprung, showing the position of the device when the fish is caught thereby. Fig. 3 shows an elevation of the upper portion only of the device, this view having been taken from the opposite side of the device. Fig. 4 is a cross sectional view, as taken on line 4—4 of Fig. 1. Fig. 5 is a cross sectional view as taken on line 5—5 of Fig. 1, and Fig. 6 is a cross sectional view as taken on line 6—6 of Fig. 1. The last three named views being enlarged from that of the others.

Similar indices denote like parts throughout the several views.

In order that the construction and the operation of my invention may be more fully understood and appreciated I will now take up a detail description thereof in which I will set forth the invention as briefly and as comprehensively as I may.

The body of my device includes the main rod A which extends straight, practically, through the center of the entire device. The upper end of rod A terminates in the head $a$, thereby providing means for the attachment of the swivel B, as shown in Figs. 1 and 2. Attached to the lower end of the rod A is the oblong plate C, said rod being located centrally of said plate and secured thereto.

Letter D denotes a comparatively large ring which surrounds the rod A and is concentric therewith, but it is not directly attached thereto.

Connected centrally to the rod A and located a short distance below the head $a$ is a hemispherical float E, formed of cork or the like, the flat portion thereof being uppermost as shown.

Formed through the rod A slightly below the float E are two apertures located at right angles to each other, one being located above the other, which are for the purposes hereinafter made apparent.

Letter F denotes a comparatively long wire having one of its ends secured in an aperture therefor formed in the left-hand end portion of the plate C; then extending upward and forming a loop $f$ around the ring $d$; then curving inward and continuing on upward, passing through the lower one of said apertures formed through the rod A, then extending down and forming a loop $f'$ around the ring D; and then extending down with its other end secured in an aperture therefor formed in the right-hand end portion of the plate C, all substantially as shown in Figs. 1 and 2.

Letter G denotes a short wire having one end looped around the ring D (as by the loop $g$), then extending upward and passing through the upper aperture formed through the rod A, and then extending down and having its other end connected to the ring D, as by the loop $g'$.

From the above it will be seen that the two wires, F and G, are located at right angles to each other, crossing each other in their centers, thereby forming a barrel which is for the purpose hereinafter set forth.

The above named parts form the main framework of my device, said parts being relatively stationary, the other parts being movable with relation thereto, and in some instances with relation to each other.

*The plunger.*—Numeral 1 denotes a disk which is concentric with and is slidable along on the rod A, being located below the ring D and above the plate C, and it is of a diameter such as not to contact with the wire F on either side thereof.

Numeral 2 denotes the small oblong plate which is located a short distance below the disk 1. Said plate 2 is also concentric with the rod A, being slidable thereon, and its major diameter is substantially the same as is the diameter of the disk 1.

Rigidly connecting the disk 1 and the plate 2 is the wire 3, on one side, also connecting said plate on the other side is the wire 4. Unlike the wire 3 said wire 4 extends on down below plate 2, through the slot e in plate C, below which latter it may extend some distance as shown. The lower extension of wire 4 of course does not form a part of the plunger, but it is at all time carried thereby as the plunger is moved up or down. The lower portion of wire 4 forms the secondary prong to which one of the hooks is secured as shown.

Numeral 5 designates a comparatively long helical spring which is coiled around the rod A. In this instance I have shown a disk 6 which may be located on the rod A just below said apertures therethrough, in which instance the wires F and G pass through said disk, or they may rest in notches in the periphery thereof. Said disk 6 forms a seat for the upper end of the spring 5, but it is possible to dispense with said disk and allow the spring to be seated against the turns in wires F and G. The lower end of spring 5 is seated against the upper face of disk 1, being adapted, normally, to push said disk 1 down to the position in which it is shown in Fig. 2.

Numeral 7 denotes the main prong, which is formed of spring wire, of substantially the same size as is prong 4. Said prong 7 passes through an aperture therefor in the plate 2 and through a similar aperture in plate C, being slidable in said apertures, extending down some distance below the latter, as shown. The upper end of prong 7 is formed into an eye or loop 7′ through which passes the rod A, and a slight distance below the eye 7′ there is formed in the wire 7 a loop 7″.

Detachably secured on the lower end of prong 7 is the hook 8; and likewise secured on the lower end of prong or wire 4 is the hook 9, said hooks should face toward each other as shown.

The trigger 10 comprises a single length of wire or the like twisted around the ring D, one end thereof being adapted to extend down and catch in the loop 7″ as shown in Fig. 1. The other end of the trigger presses on the underside of disk 1.

It should be observed that the prong 7 has only a direct up and down movement, while the prong 4 has in addition to an up and down movement a lateral movement, by reason of the slot e, the material from which the prong is formed being such as to allow it to spring back straight after being bent slightly.

The operation of my invention is very simple: A line H may be attached in the eye of the swivel and extended back as desired. Hook 8 should be provided with a bait in the usual manner. The plunger should then be pressed upward against the resiliency of spring 5 until the disk 1 is brought nearly on a level with the ring D, as in Fig. 1, one end of the trigger 10 is then hooked in loop 7″ which manifestly will retain the other end of the trigger against the underside of disk 1 and thereby holding the plunger in set position, as shown in Fig. 1. The device may then be placed in the water ready for action. It is intended that the fish in attempting to remove the bait from hook 8 will pull down thereon causing the entire prong 7 to move down and thereby pulling the loop 7″ from the trigger 10, thereby allowing the trigger to release the plunger. When the plunger is released then the spring 5 will shoot the plunger downward with great rapidity, thereby driving the hook 8 into the mouth of the fish, and driving the hook 9 down along the outside of the fish, whereby the fish will be caught between the two hooks, making it impossible for the fish to free itself. It should also be observed that when the device is set, as in Fig. 1, that the upper eye 7′ does not contact with disk 1, in fact it is some distance below it, whereby when the device is thrown the plunger will move down a certain distance before the disk 1 engages eye 7′ thereby causing the hook 9 to move first, that is moving down until it is even with hook 8 and then both will move down even with each other. These operations in practice, however, would be almost instantaneous so that they would be hardly perceptible.

I desire that it be understood that various changes may be made in several details of construction from that herein shown and described and the device may be variously operated, all without changing the principles of my invention or sacrificing any of the advantages thereof.

Having now fully shown and described my invention and the best means for its construction to me known at this time, what I claim and desire to secure by Letters Patent of the United States, is—

1. In a fishing device comprising a frame, a rod extending centrally through the frame, a plunger slidable on said rod, a spring for throwing said plunger in one direction, a trigger for holding the plunger in the other direction against the resiliency of said spring, a prong rigidly connected to the plunger and extending down below the frame, the lower portion of said prong being adapted to have a lateral movement, a second prong independent of the plunger but adapted to be moved therewith, a hook secured to the lower end of each prong and a float connected to the upper end of the frame, all substantially as shown and described.

2. A fishing device comprising a frame-like construction, a float attached to the upper portion of the frame, a line, a swivel connection between the line and the frame, a central rod extending through the frame, a plunger slidable on said rod, a helical spring adapted to throw said plunger downward, a trigger adapted to retain the plunger up against the resiliency of said spring, a sliding prong adapted to engage said trigger and hold it in engaged position and adapted to release the trigger when said prong is moved downward, a second prong connected to the plunger and extending down parallel with the first prong, hooks detachably attached to each of said prongs, one of said hooks being adapted to engage the inside and the other the outside of a fish, all substantially as shown and described.

In testimony whereof I have hereunto subscribed my name to this specification in the presence of two subscribing witnesses.

EDGAR E. OWENS.

Witnesses:
R. W. RANDLE,
R. E. RANDLE.

---

Copies of this patent may be obtained for five cents each, by addressing the "Commissioner of Patents, Washington, D. C."